Nov. 29, 1949

O. W. MURRAY 2,489,662

LIGHT-SENSITIVE PHOTOGRAPHIC
ELEMENT FOR RADIOGRAPHY
Filed Sept. 10, 1946

INVENTOR.
Otis Willard Murray
BY
Lynn Barratt Morris
ATTORNEY

Patented Nov. 29, 1949

2,489,662

UNITED STATES PATENT OFFICE 2,489,662

LIGHT-SENSITIVE PHOTOGRAPHIC ELEMENT FOR RADIOGRAPHY

Otis Willard Murray, Fords, N. J., assignor to E. I. du Pont de Nemours & Company, Wilmington, Del., a corporation of Delaware Application September 10, 1946, Serial No. 695,849

5 Claims. (Cl. 95—9)

This invention relates to photographic elements for radiography and, more particularly, to improved X-ray film elements and to their preparation.

Radiographs or finished X-ray pictures are at the present time generally made on a tinted film base. The tint is generally added to the "film dope" prior to actual coating of the film base. The base acquires a permanent tint which renders it of less value from the scrap recovery aspect. It has also been proposed to add the dyes to a substratum layer which is deposited on the base over which the silver halide emulsion is coated. The dyes, however, permanently discolor the surface of the film base because the solvents used "bite" and carry the dye into the surface of the film base. Furthermore, the dyes or tinting materials customarily employed in tinting substratum coatings have poor stability. It has been difficult to obtain a uniform tint in a substratum layer.

An object of the present invention is to provide an improved radiographic element which permits the transmission of light in those portions of the spectrum that will improve the clarity and contrast of the radiograph. A further object is to provide such elements which have a better scrap recovery value. A still further object is to provide such elements with more stable tints. Yet another object is to provide radiographic film elements with tinted layers for improving the visual acuity in viewing finished radiographs. Still other objects will appear hereinafter.

It has been found that tinted radiographic elements of good clarity and contrast of the finished radiograph and improved stability can be made by incorporating the phosphotungstic acid or phosphomolybdic acid salts of basic dyes of blue and violet shades in an outer or anti-abrasion coating which is disposed on the light-sensitive silver halide emulsion layer or layers.

Figure 1:
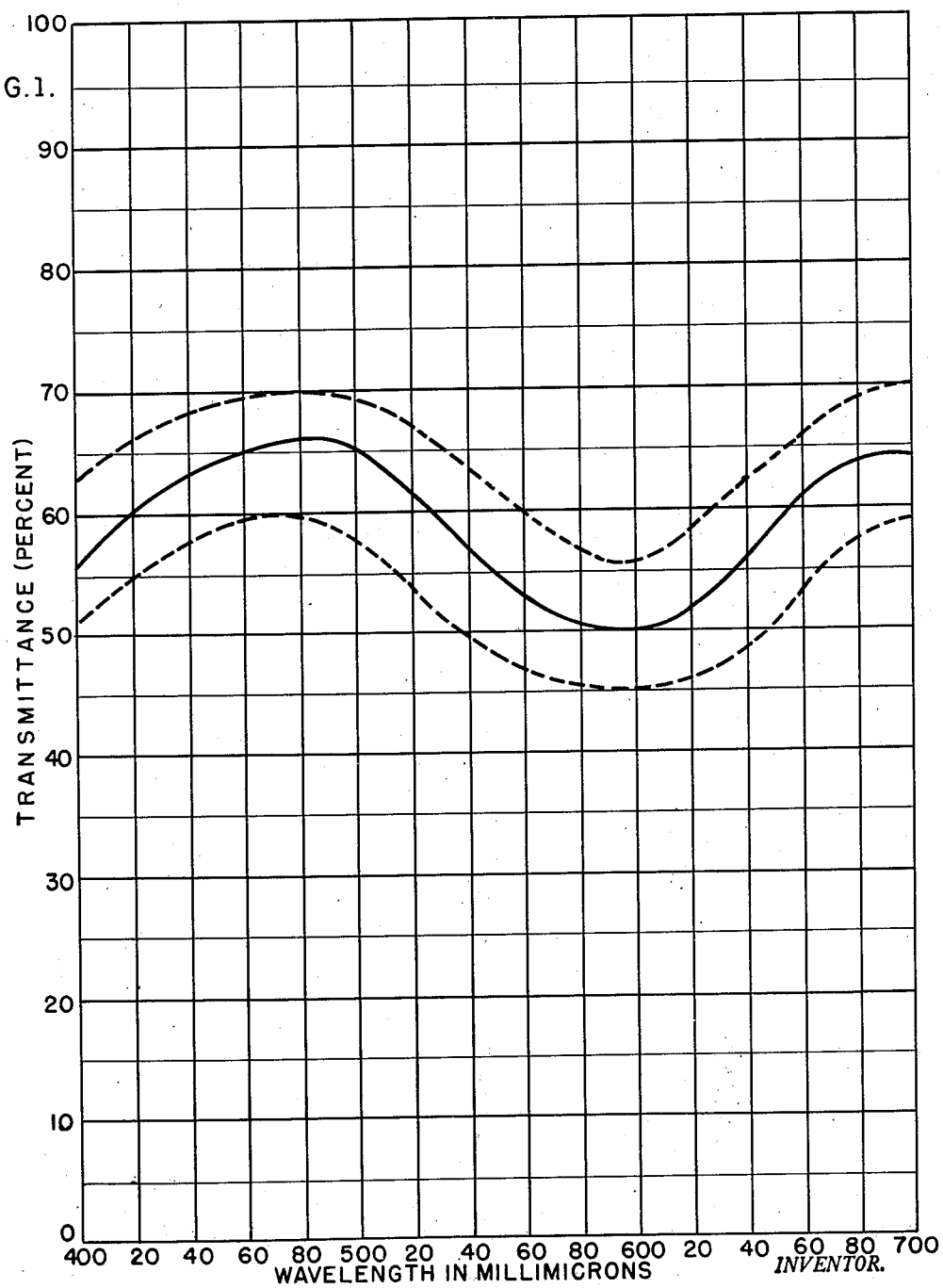

The phosphotungstic and phosphomolybdic salts of the basic dyes should have their maximum degree of absorption within the 530 to 650 millimicron region of the spectrum and should be used in such amounts that they confer a weak, uniform overall tint to the layer. The tinted layers may have a maximum light-transmission in the middle of said region of about 40 to 70% and preferably about 45 to 55% and transmission from 60 to 70% of light in the violet and blue, and for red regions of the spectrum. Light absorption curves are shown in Figure 1 of the attached drawing. The solid curve in the drawing is illustrative of optimum values obtainable from the dyes of the specific examples below. The dotted curves represent maximum and minimum values. When two tinted layers are used, e. g., disposed on each emulsion layer of a duplitized X-ray film part, preferably one-half of the total coloring pigment may be used on each side.

The preferred salts are the phosphotungstic and phosphomolybdic acid salts of certain triphenylmethane dyes. More particularly, the fuchsone imonium dyes of the fuchsine class, especially the aminoalkyl and aminoaryl substituted dyes including the methyl, ethyl, and phenyl substituted dyes, e. g., Methyl Violet (Colour Index #680), Ethyl Violet (Colour Index #682), and Victoria Blue (Colour Index #729) are preferred.

The Color Index numbers referred to above are those of the Colour Index of The Society of Dyers and Colourists, edited by F. M. Rowe, First Edition, published by the Society at Bradford, Yorkshire, England.

The aforesaid dye salts may be admixed with a water-permeable colloid by addition from an organic solvent solution or from a fine aqueous or solvent dispersion of the dye salts. A very fine dispersion is necessary so that the tinted layer will have a uniform tint or color with the above light-transmission characteristics. When the particles are properly formed and homogeneously dispersed, they show no grain when magnified 800 to 1000 times under the microscope.

The dye salt particles may preferably be dispersed mechanically in comminuting and colloid mill apparatus of known type or colloido-chemically, preferably by the use of wetting and dispersing agents. Suitable wetting agents include alkali metal salts, e. g., sodium and potassium salts of n-alkane sulfuric acid esters and sulfonic acids of 8 to 18 carbon atoms, the alkali metal salts of alkylated naphthalene sulfonic acids, the N-alkyl and C-alkyl betaines wherein the alkyl groups contain 8 to 18 carbon atoms; and wetting agents of non-ionic type, e. g., the polyethylene glycols containing 8 or more ethylene units and their alkyl ethers and carboxylic acid esters, for example, nona- and dodecaethylene glycol and their mono- and dimethyl and ethyl ethers, and the hexitan derivatives, e. g., the polyoxyl alkylene ethers and esters of U. S. Patent 2,440,532.

It has been found that the aforesaid dye salt particles do not migrate from thin gelatin layers or layers of other water-permeable colloids having similar hydrophilic characteristics. Hence, when the colloid containing the dispersed particles is applied from an aqueous solution, a separate protective layer results which has no deleterious effect on the appertaining silver halide emulsion layer. When the discarded finished radiographic films are treated for scrap recovery by first removing the colloid layers from the base in the usual manner, no dye discoloration of the film base occurs.

The invention will be further illustrated by the following examples.

*Example I*

Figure 2:

A cellulose acetate film was provided on each side with a thin anchoring substratum to form a film base 1, as shown in Fig. 2 of the drawing. A gelatino-silver bromide X-ray type emulsion layer was coated on each side of said base to form layers 2 and 3 each having a coating weight of about 110 mg. of AgBr per sq. dec. Tinted antiabrasion layers 4 and 5 were then coated at 98° F. to a weight of 20 mg. per sq. dec. onto the emulsion layers. The coating solution for the tinted layers consisted of an aqueous dispersion of the phosphotungstic acid salt of Ethyl Violet in gelatin and was prepared as follows: A gelatin solution was prepared by admixing 10 grams of gelatin with 150 cc. of water at 120° F. The solution was mixed with a solution made by admixing one gram of the phosphotungstic acid salt of Ethyl Violet with 150 cc. of water and 25 cc. of a 5% aqueous solution of saponin. The resulting element was then exposed to X-rays from the lungs, developed in an ordinary X-ray developer, and fixed in the usual manner. The tinted antiabrasion layer imparted to the lungs areas of the radiograph an extremely beneficial clarity and detail. No migration of the phosphotungstic acid salt into the gelatino-silver halide layer was perceptible. The resulting film base was recovered after removal of the colloid layers in a good, clear condition. The dye salt was readily removed by the enzyme of an alkaline-trypsin treatment after the method generally used in scrap film recovery.

*Example II*

A cellulose acetate film was coated on one side with a thin anchoring substratum upon which was coated a 100 mg. of silver bromide per sq. dec. layer from an aqueous gelatin dispersion containing one gram of particles of the phosphotungstic acid salt of Victoria Blue per 25 grams of gelatin. The particles had a diameter of less than 1$\mu$ and an average diameter of about 0.5$\mu$. The dispersion was made after the manner described in Example I. A normal radiograph of the sinus when developed and fixed had excellent clarity and detail. No deleterious action on the speed or stability of the emulsion layers was noted. The recovered cellulose acetate was free from color.

Similar results were obtained by the use of the phosphomolybdic salt of Ethyl Violet. They may be used in an amount of 1 to 20 per 20 parts of gelatin or other colloid.

Various colloids other than gelatin can be used as the binding agent for the tinted antiabrasion or protective layer. Suitable additional colloids include casein, agar agar, albumin, hydrophilic polyamides, hydrophilic polyvinyl acetals, the hydrophilic hydrolyzed ethylene polyvinyl acetates of United States Patent 2,397,866, etc.

The invention has the advantage that an improved tinted X-ray element can readily be prepared. A further advantage is that the colored pigments used do not deleteriously effect the silver halide emulsion layers. A still further advantage is that a clear film dope can be recovered. High light stability pigments may be utilized. The pigment is removed from the deleterious effect of the acid substratum and acids given off by the decomposition of the base on aging.

As many widely different embodiments of this invention can be made without departing from the spirit and scope thereof it is to be understood that the invention is not to be limited except as defined by the claims.

What is claimed is:

1. An X-ray sensitive element comprising a transparent support, a light-sensitive silver halide-colloid emulsion layer deposited on each surface of said support and a tinted water-permeable protective layer on each emulsion layer which has a maximum degree of light-absorption in the 530 to 650 millimicron region of the spectrum, absorbs about 40 to 70% of light in the middle of said region and transmits approximately 60 to 70% of light in the violet and blue, and far red regions of the spectrum, said layer being tinted with a salt taken from the class consisting of the phosphotungstic and phosphomolybdic salts of a basic dye.

2. An X-ray sensitive element comprising a transparent support, a light-sensitive silver halide-colloid emulsion layer deposited on each surface of said support and a tinted water-permeable protective layer on each emulsion layer which has a maximum degree of light-absorption in the 530 to 650 millimicron region of the spectrum, absorbs about 50% of light in the middle of said region and transmits approximately 65% of light in the violet and blue and far red regions of the spectrum, said layer being tinted with a salt taken from the class consisting of the phosphotungstic and phosphomolybdic salts of a basic dye, taken from the class consisting of the methyl-, ethyl-, and phenyl-amino substituted basic dyes of the fuchsine type.

3. An X-ray sensitive element comprising a transparent support, a light-sensitive silver halide-colloid emulsion layer deposited on each surface of said support and a tinted water-permeable protective layer on each emulsion layer which has a maximum degree of light-absorption in the 530 to 650 millimicron region of the spectrum, absorbs about 45 to 55% of light in the middle of said region, and transmits approximately 60 to 70% of light in the violet and blue and far red region of the spectrum, said layer being tinted with a salt taken from the class consisting of the phosphotungstic and phosphomolybdic acid salts of Methyl Violet.

4. An X-ray sensitive element comprising a transparent support, a light-sensitive silver halide-colloid emulsion layer deposited on each surface of said support and a tinted water-permeable protective layer on each emulsion layer which has a maximum degree of light-absorption in the 530 to 650 millimicron region of the spectrum, absorbs about 45 to 55% of light in the middle of said region and transmits approximately 60 to 70% of light in the violet and blue and far red regions of the spectrum, said layer being tinted with a salt taken from the class consisting of the phosphotungstic and phosphomolybdic acid salts of Ethyl Violet.

5. An X-ray sensitive element comprising a transparent support, a light-sensitive silver halide-colloid emulsion layer deposited on each surface of said support and a tinted water-permeable protective layer on each emulsion layer which has a maximum degree of light-absorption in the 530 to 650 millimicron region of the spectrum, absorbs about 45 to 55% of light in the middle of said region and transmits approximately 60 to 70% of light in the violet and blue and far red regions of the spectrum, said layer being tinted with a salt taken from the class consisting of the phosphotungstic and phosphomolybdic acid salts of Victoria Blue.

OTIS WILLARD MURRAY.

REFERENCES CITED

The following references are of record in the file of this patent:

UNITED STATES PATENTS

| Number | Name | Date |
|---|---|---|
| 1,900,877 | Hickman | Mar. 7, 1933 |
| 1,905,438 | Capstaff | Apr. 25, 1933 |
| 1,973,886 | Scanlan et al. | Sept. 18, 1934 |
| 2,080,041 | Gaspar | May 11, 1937 |

FOREIGN PATENTS

| Number | Country | Date |
|---|---|---|
| 421,727 | Great Britain | Dec. 24, 1934 |
| 442,522 | Great Britain | Feb. 3, 1936 |
| 510,598 | Great Britain | July 31, 1939 |

Certificate of Correction

November 29, 1949

Patent No. 2,489,662

OTIS WILLARD MURRAY

It is hereby certified that errors appear in the printed specification of the above numbered patent requiring correction as follows:

Column 3, line 47, after the word "enzyme" insert *action*; column 4, line 29, before "salts" insert *acid*;

and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*